Patented July 19, 1932

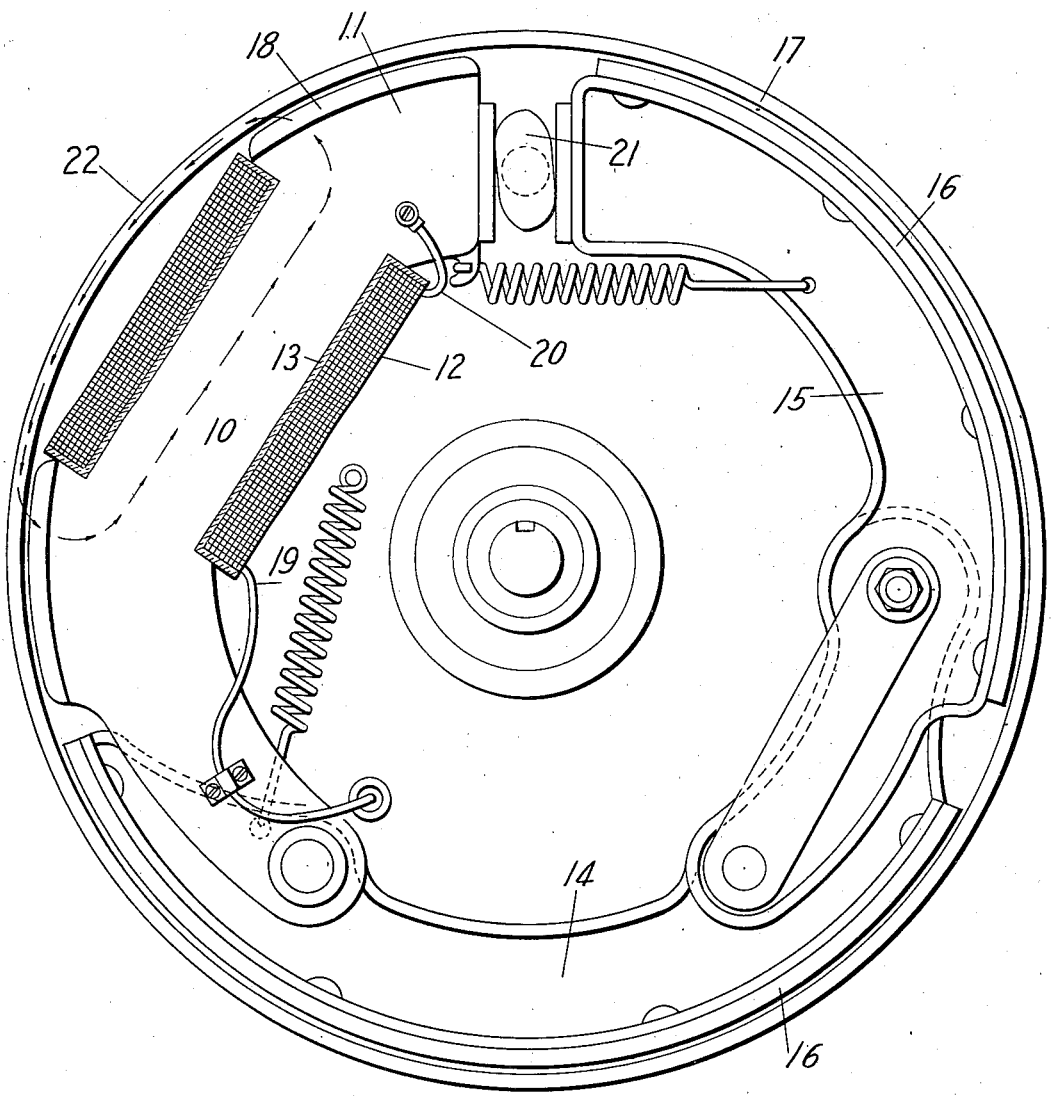

1,867,645

UNITED STATES PATENT OFFICE

VINCENT G. APPLE, OF DAYTON, OHIO, ASSIGNOR TO BENDIX BRAKE COMPANY, OF SOUTH BEND, INDIANA, A CORPORATION OF ILLINOIS

MANUAL-MAGNETIC SERVO-BRAKE

Application filed July 16, 1928. Serial No. 293,191.

My invention relates to improvements in brakes and particularly brakes as used on motor vehicles.

An object is to provide a servo brake wherein the servo shoe is urged against the drum mechanically and also magnetically; and wherein, in brake mechanism embodying a plurality of interconnected shoes, one of which acts as a servo shoe to urge the other shoes against the drum, an electric coil, is carried by the servo shoe and energized to urge said shoe against the drum simultaneously with the manual actuation of mechanical means urging said shoe against the drum.

A meritorious feature resides in the provision of a brake shoe for use within a brake drum which shoe is formed of magnetizable material and carries an electric coil, and forms magnetic contact with the drum upon energization of the coil.

Other objects, advantages and meritorious features of my inventinon will more fully appear from the following specification, appended claims and accompanying drawing.

The figure of the drawing illustrates in side elevation a three shoe servo brake structure constructed to embody my invention.

In a recess 10 formed in primary brake shoe 11, a coil 12 of relatively heavy insulated wire surrounds spool 13 of insulating material. Secondary brake shoe 14 and auxiliary brake shoe 15 are made in the conventional manner from stampings, and carry the usual fabric brake linings 16 which engage drum 17. But brake shoe 11 is of a relatively heavy section of a magnetizable material so as to provide sufficient core to carry the magnetism created by current passing through coil 12. Instead of having fabric brake lining, shoe 11 has an integral flanged portion 18 which engages drum 17 when the brakes are applied, the metal to metal contact between shoe and drum providing low magnetic reductance.

Lead 19 conveys current from a battery or other suitable current source to coil 12. Lead 20 conducts the current from the coil to the ground.

Simultaneously with the application of manual effort on cam 21 to manually apply the brakes, a suitable switch, not shown, is operated to connect coil 12 to the current source, whereupon a magnetic circuit is established as shown by arrows 22 causing magnetic effort to be added to the manual effort in forcing flange 18 against drum 17.

Shoes 14 and 15 are preferably made of non-magnetic material to prevent magnetic leakage therethrough, and fabric linings 16 should be impregnated with sufficient graphite or other lubricant to lubricate the surface of drum 17 to prevent scoring between it and the metal flange 18.

What I claim is:

1. In a manual-magnetic servo brake, the combination of a brake drum, primary and secondary arcuate brake shoes concentrically arranged within said drum and interconnected whereby the primary shoe acts to apply the secondary shoe, manual means to apply said primary shoe to said drum, and an electric coil about the primary shoe to assist said manual means.

2. In a manual-magnetic servo brake, the combination of a brake drum, pivotally connected primary and secondary brake shoes, said primary shoe including an interrupted arcuate friction surface, a cam to apply said primary shoe to said drum, and an electric coil about the interrupted portion of said primary shoe to assist said cam.

3. In a manual-magnetic servo brake, the combination of a brake drum, primary and secondary brake shoes, a fabric braking surface on said secondary shoe, a metal braking surface on said primary shoe, manual means to apply said primary shoe to said drum, and an electric coil on the primary shoe to assist said manual means.

4. In a manual-magnetic servo brake, the combination of a brake drum, primary and secondary brake shoes, a fabric braking surface carrying a lubricant on said secondary shoe, a metal braking surface on said primary shoe, manual means to apply said primary shoe to said drum, and an electric coil on the primary shoe to assist said manual means.

5. Brake mechanism comprising, in combination, a brake drum, an arcuate brake shoe arranged concentrically within the drum to be urged thereagainst, manually operable means engaging the shoe to urge it against the drum, said shoe having an electric coil wound about its intermediate portion and carried thereby and operable to urge the shoe magnetically against the drum.

6. Brake mechanism comprising, in combination, a brake drum, an arcuate brake shoe arranged concentrically within the drum, manually operable means engaging the shoe to urge it against the drum, said shoe being formed of magnetizable material and having end portions adapted to form magnetic contact with the drum and an intermediate portion spaced from the drum and an electric coil wound about said intermediate portion to urge the shoe magnetically against the drum.

7. Brake mechanism comprising, in combination, a brake drum, an arcuate brake shoe arranged within the drum, manually operable means engaging the shoe to urge it against the drum, said shoe being formed of magnetizable material and having a reduced intermediate portion about which is wound an electric coil connected in a circuit including a source of electric energy and the drum adapted upon its energization to urge the shoe magnetically against the drum.

8. Brake mechanism comprising, in combination, a rotatable brake drum, an arcuate retarding member concentrically arranged within the drum to be urged thereagainst having an intermediate restricted portion spaced from the drum and end portions adapted to engage the drum, an electric coil wound about said intermediate portion adapted to act through the end portions to cause them to engage the drum.

9. Brake mechanism comprising, in combination, a rotatable brake drum, an arcuate retarding member formed of magnetizable material arranged concentrically within the drum to be urged thereagainst having an intermediate portion spaced from the drum and end portions adapted to magnetically and frictionally engage the drum, an electric coil wound about said intermediate portion adapted to act through the end portions to cause them to engage the drum.

10. Brake mechanism comprising, in combination, a rotatable brake drum, an arcuate brake shoe formed of magnetizable material concentrically arranged within the drum and having end portions adapted to engage therewith and an intermediate restricted portion, an electric coil wound about said intermediate portion and spaced from the drum acting through the end portions to magnetically engage the drum.

11. Brake mechanism comprising, in combination, a rotatable brake drum, arcuate retarding means arranged to be urged thereagainst, an electric magnet carried by one end of said retarding means to cause said end to magnetically engage the drum, friction material provided with a lubricating substance carried by the opposite end of said retarding means and adapted to be brought into engagement with the drum.

12. Brake mechanism comprising, in combination, a rotatable brake drum, arcuate retarding means arranged to be urged thereagainst, one portion of said retarding means being formed of magnetizable material adapted to be brought directly into engagement with the drum and including an electromagnet adapted to urge the same magnetically into engagement therewith, and another portion of said retarding means having a friction facing carrying a lubricating substance adapted to engage the drum.

13. Brake mechanism comprising, in combination, a rotatable brake drum, a plurality of brake friction members arranged therein, one of said members being anchored at one end and having its free end connected with another member to be urged into frictional engagement with the drum thereby, said other member having its opposite end free, a manually operable part engaging the free end of the unanchored member to urge it mechanically against the drum, said unanchored member having a magnetizable portion adapted to be brought directly into engagement with the drum and carrying electromagnet means acting through said portion to cause it to magnetically engage the drum, said anchored member having a facing carrying lubricating material and adapted to be brought into engagement with the drum.

14. Brake mechanism comprising, in combination, a rotatable brake drum, retarding means arranged to be urged into engagement therewith having one portion formed of magnetizable material adapted to be brought directly into engagement with the drum and carrying an electromagnet, and a second portion having a non-magnetic facing carrying lubricating substance adapted to be brought into engagement with the drum.

15. Brake mechanism comprising, in combination, a rotatable brake drum, retarding means anchored at one end and having its opposite end free, a manually operable part engaging said free end to actuate the retarding means into frictional engagement with the drum, the free end of said retarding means having a portion formed of magnetizable material and an electromagnet operable to urge said portion into braking engagement with the drum, the anchored end of said retarding means having a drum engaging facing formed of substantially non-magnetic material.

16. Brake mechanism comprising, in combination, a rotatable brake drum, retarding means arranged to be urged into engagement therewith comprising a plurality of arcuate brake friction members arranged concentrically within said drum, one of said friction members constituting an electro-magnet to urge it against the drum, said friction member adapted to act upon another friction member to urge it against the drum.

17. Brake mechanism including a rotatable brake drum, an arcuate articulate brake shoe concentrically arranged in said drum and supported for movement into frictional engagement therewith, said shoe including a restricted portion spaced from the drum, and an electric coil carried by said portion adapted upon energization to cause the brake shoe to magnetically engage the drum.

18. In combination with brake mechanism including a plurality of arcuate expansible friction means, a restricted portion interrupting the arc of one of said friction means, and an electric coil wound about said restricted portion.

19. Brake mechanism including, in combination, a rotatable drum, an arcuate shoe secured against rotation adjacent the inner periphery of said drum and in concentric relation therewith, a restricted portion interrupting the arc of said shoe having an electric coil thereabout, said restriction being of a depth sufficient to permit said coil to lie closely adjacent the inner and outer arcuate edges of said shoe.

20. Brake mechanism comprising, in combination, a rotatable drum, arcuate friction means concentrically arranged therein to be urged thereagainst to retard its rotation having a portion of reduced width, and an electric coil carried by said portion of reduced width.

21. Brake mechanism including an arcuate brake shoe adapted to be urged against a moving member to retard the same, said shoe having an interrupted friction surface and including a restriction along the interrupted portion to space said portion from the member and an electric coil wound about said restriction.

In testimony whereof, I, VINCENT G. APPLE, sign this specification.

VINCENT G. APPLE.